Jan. 31, 1939. L. C. SHIPPY 2,145,376
MANUFACTURE OF BUILT-UP BELLOWS
Filed Jan. 21, 1935 5 Sheets-Sheet 1
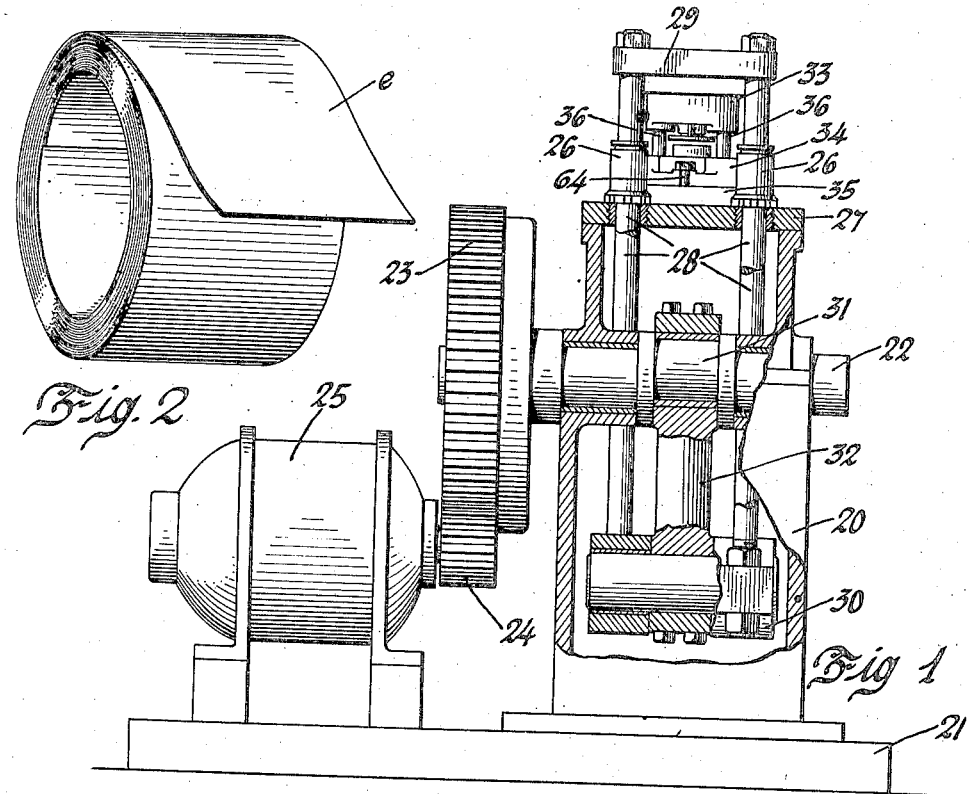
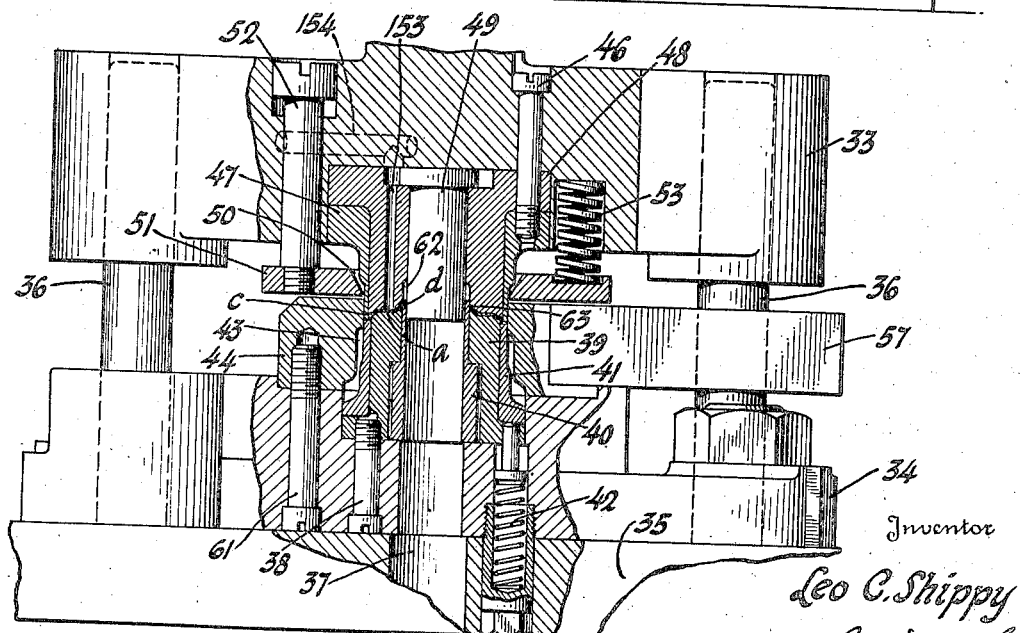
Inventor
Leo C. Shippy

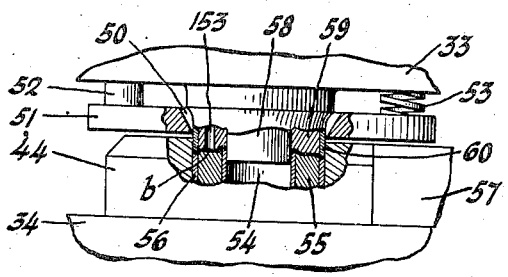
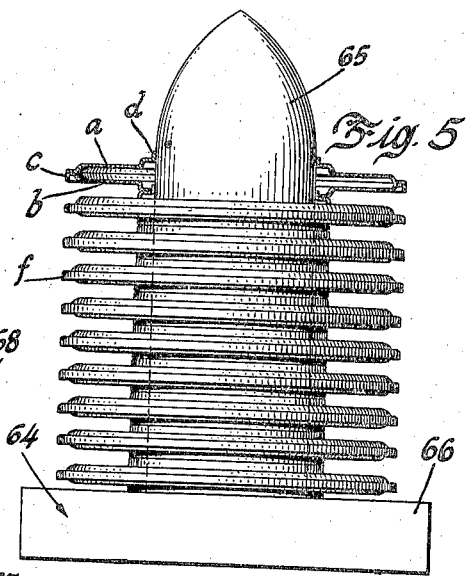
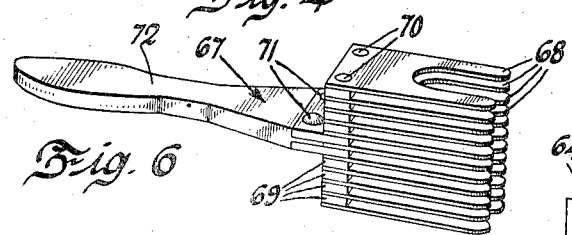
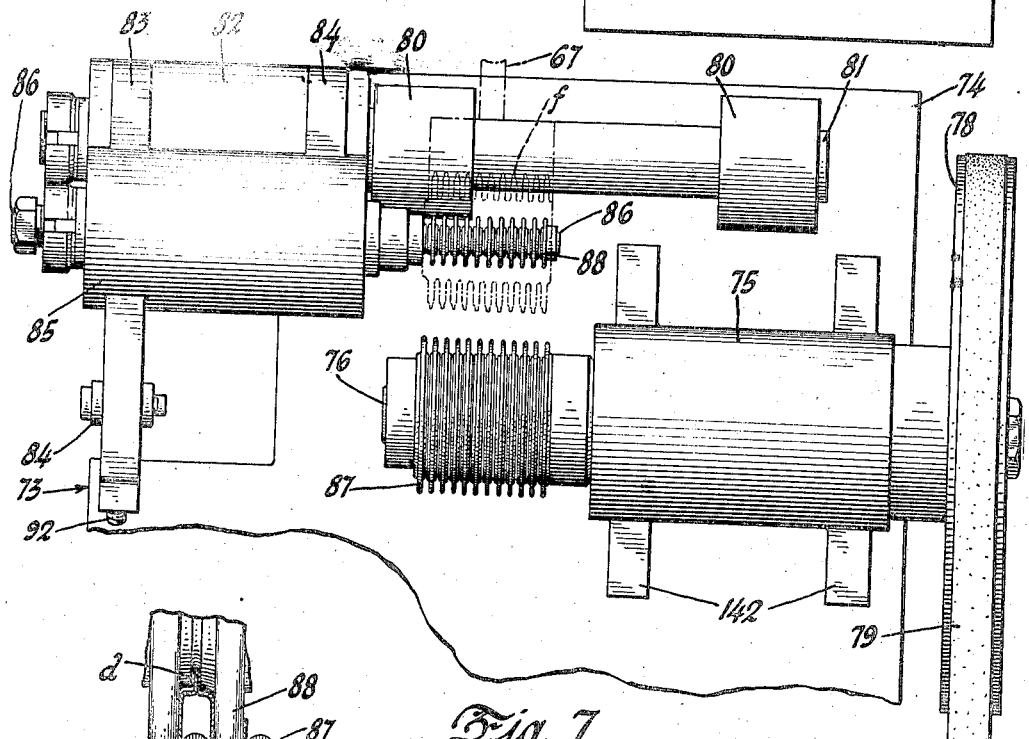
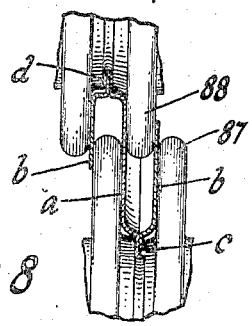

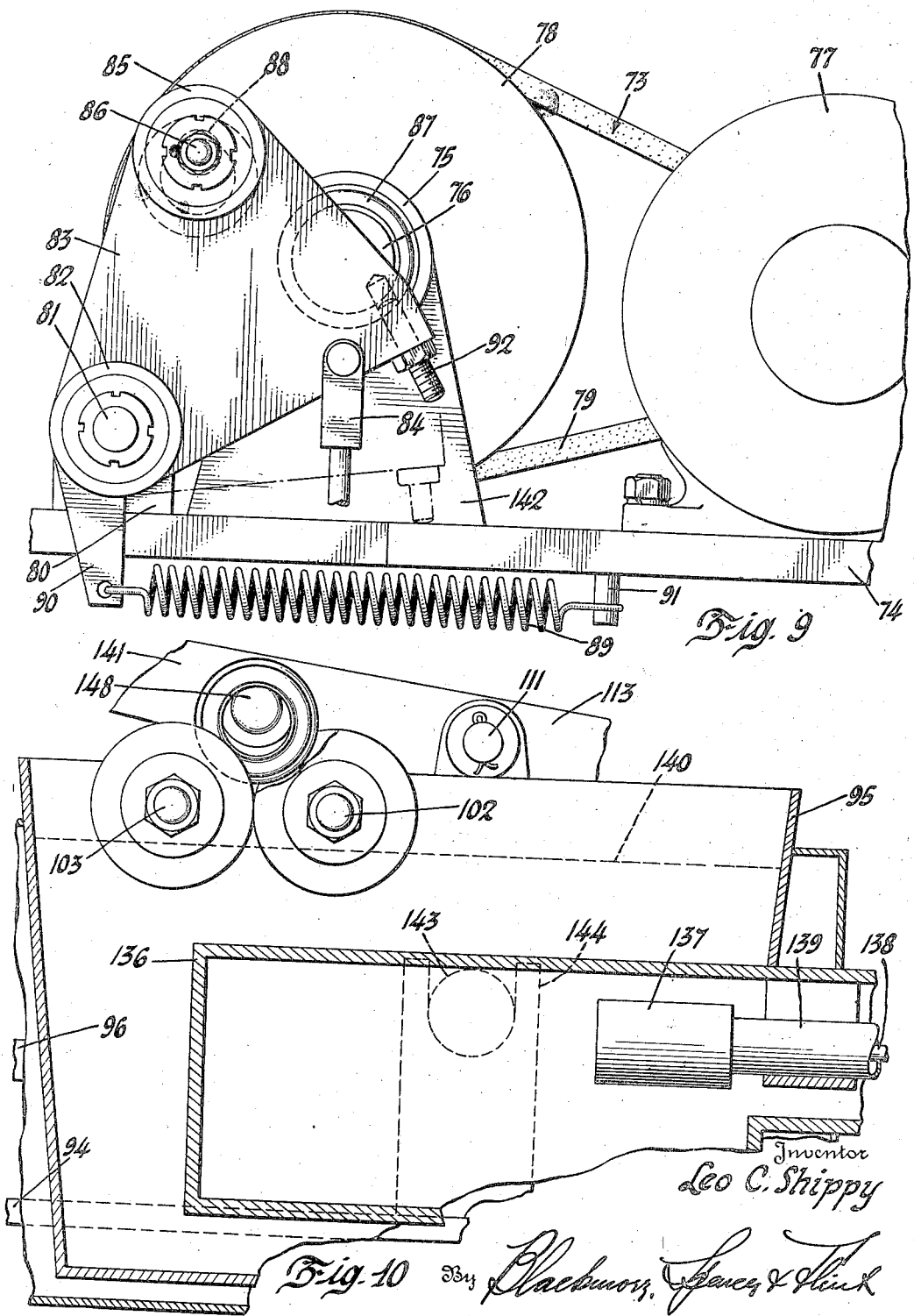

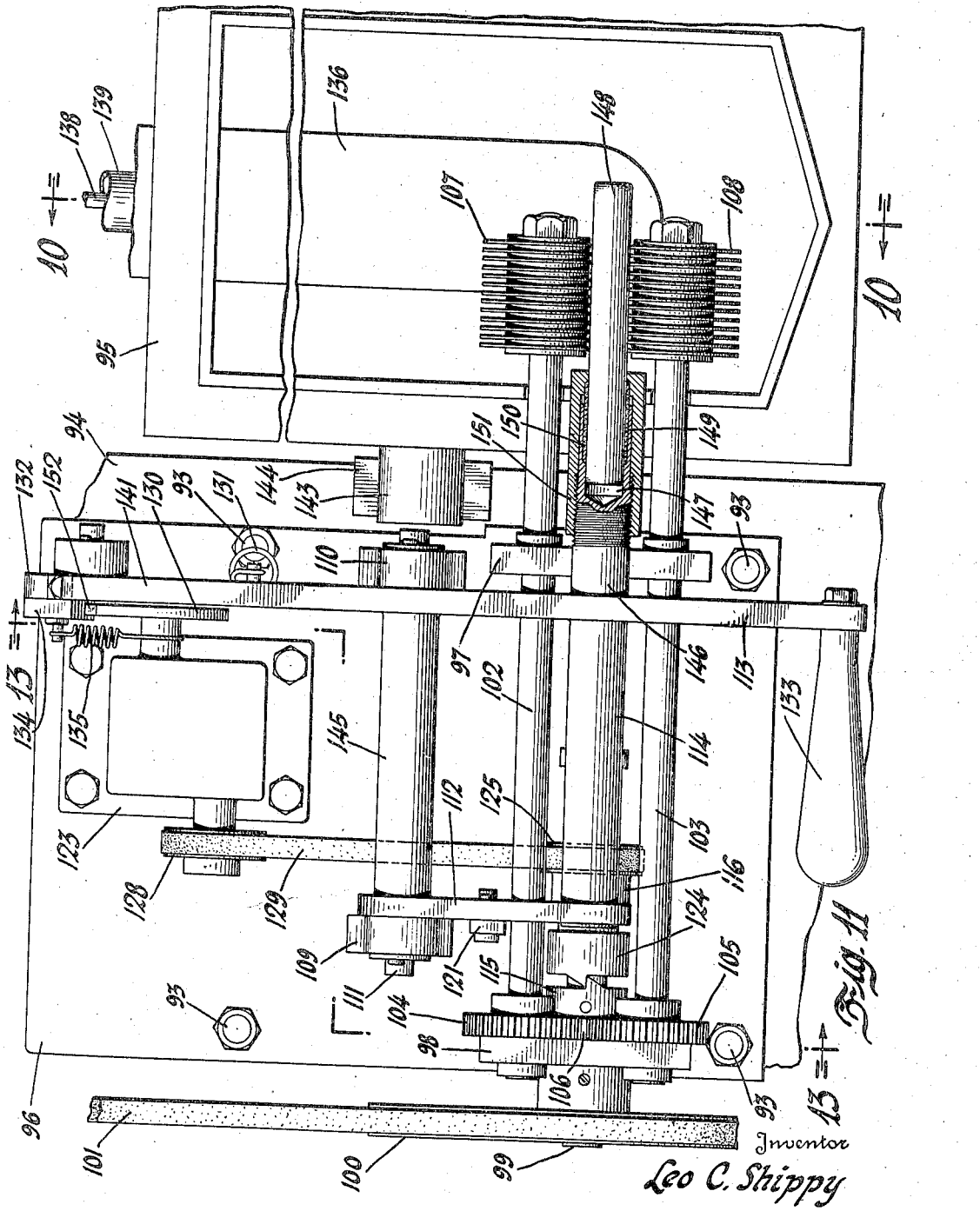

Jan. 31, 1939.  L. C. SHIPPY  2,145,376
MANUFACTURE OF BUILT-UP BELLOWS
Filed Jan. 21, 1935  5 Sheets-Sheet 5
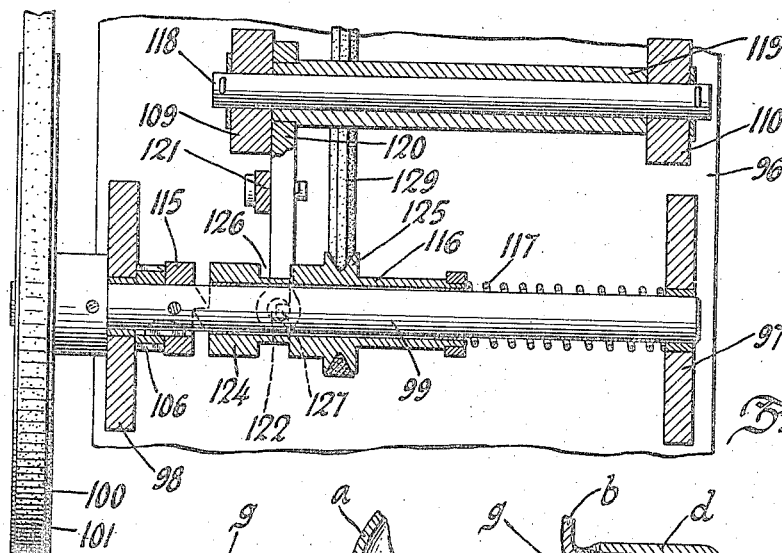

Patented Jan. 31, 1939

2,145,376

UNITED STATES PATENT OFFICE 2,145,376

MANUFACTURE OF BUILT-UP BELLOWS

Leo C. Shippy, Lockport, N. Y., assignor to General Motors Corporation, Detroit, Mich., a corporation of Delaware Application January 21, 1935, Serial No. 2,687

7 Claims. (Cl. 113—59)

In the Schutt Patent No. 2,071,583, there is disclosed a built-up bellows which is made by producing concavo-convex male and female discs from thin, flexible and resilient sheet metal, assembling a number of the male and female discs into a stack, locking the several discs in the stack together by a crimping operation, and soldering the crimped joints in the stack of discs.

This invention relates to the manufacture of built-up bellows of the type disclosed in the Schutt patent mentioned above and resides primarily in apparatus by means of which built-up bellows of this type may be speedily and economically produced. More specifically, the invention resides in (a) apparatus by means of which the discs of which the bellows are to be made may be speedily and economically produced, (b) apparatus or a method by means of which discs may be speedily and economically assembled into a stack, transferred to a spinning machine and spun together, and (c) apparatus or a method by means of which all of the joints of a spun-together stack of discs may be soldered in a single operation.

For a better understanding of the nature and objects of this invention, reference is made to the following specification, wherein there is described the preferred embodiment of the invention which is illustrated in the accompanying drawings.

In the accompanying drawings:

Figure 1 shows, partly in elevation and partly in section, a dieing machine which may be used in producing the male and female discs of which the bellows to which this invention relates are made.

Figure 2 is a perspective view of a roll of stock from which the discs may be made;

Figure 3 is an enlarged view, partly in section and partly in elevation of the dies used in the dieing machine to produce the female discs from the stock.

Figure 4 is an enlarged fragmentary view, partly in section and partly in elevation, of the dies used in the dieing machine to produce the male discs from the stock.

Figure 5 shows a stacking stand with male and female discs produced by the dieing machine stacked on it.

Figure 6 is a perspective view of a disc holder for transferring a stack of discs from the stacking stand to the spinning machine shown in Figures 7, 8 and 9 and holding them during the spinning operation.

Figure 7 is a fragmentary plan view of a machine for spinning a stack of discs together.

Figure 8 is an enlarged fragmentary view of a pair of discs in the spinning machine.

Figure 9 is a fragmentary side elevation of the spinning machine.

Figure 10 is a view, taken on the line 10—10 of Figure 11, of a machine for soldering the joints of a spun-together stack of discs.

Figure 11 is a plan view of the soldering machine with parts in section.

Figure 12 is a fragmentary section through the soldering machine taken on the line 12—12 of Figure 13.

Figure 13 is a view of the soldering machine taken mainly as indicated by the line 13—13 of Figure 11.

Figure 14 is a fragmentary view, partly in elevation and partly in section, of a completed bellows.

Figures 15 and 16 are, respectively, enlarged sections through one of the outer joints and through one of the inner joints of the bellows shown in Figure 14.

The dieing machine shown in Figure 1 includes a hollow base 20, which is mounted on a floor plate 21. In opposite side walls of the base, there is journaled a shaft 22. To one end of the shaft 22, without the base, there is fixed a gear 23 which meshes with a gear 24 which is fixed to the shaft of an electric motor 25, which is also mounted on the floor plate 21. Through guides 26 which are secured in a plate 27 which closes the upper end of the base 20, there extend four rods 28. To the upper ends of these rods, there is secured a head 29, and to the lower end thereof within the hollow base a head 30. On the shaft 22 between its ends, there is formed a crank 31, which is connected to the lower head 30 by a connecting rod 32.

Each of the sets of disc blanking and forming dies which are shown in Figures 3 and 4 includes an upper block 33 and a lower block 34 which is secured to a bolster plate 35. To the lower block of each set of dies, there are secured guide rods 36 which extend through openings in the upper block of that set.

In a recess in each of the lower blocks 34, there is seated a lower forming die. Each of these forming dies consists of three annular elements which are designated by the reference characters 40, 39 and 41 in Figure 3 and by the reference characters 54, 55 and 56 in Figure 4. The opening in the inner die element registers with an opening 37 in the block 34 in which it is seated and in the bolster plate 35 to which the block is secured. The inner and intermediate die elements of each set are secured to the block 34 in which they are seated by screws 38. The outer die element of each set is movable up and down with respect to the inner and intermediate die elements thereof and is urged to its uppermost position by springs 42. The upper end of each of the lower forming dies extends into an opening 43 in a lower blanking die 44 which is secured by screws 61 to the block 34 in which the forming die is seated. Each of the lower blanking dies 44 limits upward movement of the outer element of the lower forming die with which it is associated and has secured thereto a shelf 57.

In a recess in each of the upper blocks 33, there is seated an upper blanking and forming die. Each of these blanking and forming dies consists of a cylindrical element and two annular elements which are designated in Figure 3 by the reference characters 49, 48 and 47 and in Figure 4 by the reference characters 58, 59 and 60. The die elements of each set are secured to the block 33 in which they are seated by screws 46. Each of the cylindrical elements 49 and 58 is coaxial with and of such diameter that it can just slide into the opening in the inner element of the lower forming die with which it is associated. Through each of the intermediate elements 48 and 59, there extend vertical bores 153 whose upper ends communicate with a bore 154 in the block 33 in which the element is seated. Each of the outer annular elements 47 and 60 is coaxial with and of such external diameter that it can just slide into the opening 43 in the lower blanking die with which it is associated. The lower end of each of the upper blanking and forming dies extends into an opening 50 in a plate 51 which is connected by guide pins 52 to the block 33 in which the die is seated so that it can move toward and away from it. Springs 53 urge the plate 51 toward its lowermost position.

To insure the formation of perfect solder joints during the soldering operation hereinafter referred to, it is preferable that the dies shown in Figure 4 be designed to provide for the formation of scallops, such as those illustrated and described in the Shutt patent previously mentioned, in the outer edges of the male discs $b$. Otherwise, the dies shown in Figure 3 differ from those shown in Figure 4 principally in that the former are shaped to provide for the formation of flanges $c$ and $d$ on the outer and inner edges of the female discs $a$ by (1) making the intermediate die element 48 of greater external diameter than the intermediate die element 39 by the thickness of the stock from which the discs are made, (2) making the outer die element 47 of such length that it extends beyond the lower end of the intermediate die element 48 a distance equal to the depth of the flanges $c$ and the outer die element 41 of such length that when it is in its lowermost position it terminates below the outer portion of the intermediate die element 39 the same distance and (3) providing in the inner edge of the intermediate die element 48 a rabbet 62 of considerably greater depth than the flanges $d$ and a counter-rabbet 63 whose depth is equal to that of the flanges $d$ and whose width is equal to the thickness of the stock from which the discs are made and making the inner die element 40 of such length that it extends into the rabbet 62 beyond the counter-rabbet 63 when the dies are closed.

Each of the sets of blanking and forming dies is designed for installation in a dieing machine, such as that shown in Figure 1, with the upper block 33 secured to the upper head 29 by screws (not shown) and the lower block 34 and bolster plate 35 secured to the plate 27 by screws 64.

The stacking stand which is designated by the reference character 64 consists of an upstanding stud 65 mounted on a base 66. The external diameter of the stud, which has a blunt point on its upper end, is slightly less than the internal diameter of the female discs $a$.

The disc holder 67 is a fork-like implement which consists of a number of deeply notched plates 68 spaced apart by strips 69 and secured together by rivets 70. To two of the strips 69 which are wider than the others, there is secured by rivets 71 a handle 72.

The spinning machine 73 consists of a table 74 on which near one side there are mounted brackets 142 which support a bearing 75 in which there is journaled a shaft 76. On the same side of the table as the bearing 75, there is mounted an electric motor 77 on whose shaft there is secured a pulley (not shown). Around this pulley and a pulley 78 on the shaft 76 extends a belt 79.

In brackets 80 which are mounted on the table 74 on the side of the shaft 76 opposite that on which the electric motor 77 is mounted, there is secured an axle 81 which extends parallel to the shaft 76. On the end of the axle 81 near the side of the table 74 opposite that on which the bearing 75 and the electric motor 77 are mounted, there is journaled a bearing 82. To the bearing 82, there are welded plates 83 and 84 which carry a bearing 85. In the bearing 85, there is journaled an arbor 86 which extends parallel to the shaft 76. On the inner end of the arbor 86, which extends considerably beyond the inner end of the shaft 76, there is formed an annularly corrugated crimping roll 88. On the inner end of the shaft 76 opposite the roll 88, there is secured a considerably larger annularly corrugated crimping roll 87 which is so disposed axially of the shaft 76 that each of the annulets on the roll 88 is located opposite one of the annular grooves in the roll 87.

The spring 89 which is connected to an arm 90 on the bearing 82 and to a stud 91 on the table 74 tends to swing the arbor 86 and the roll 88 about the axle 81 away from the shaft 76 and the roll 87. For moving the roll 88 about the axle 81 toward the roll 87, there is provided a pedal (not shown) which is connected to the plate 83 by a link 84. A set screw 92 which is adapted to engage the table 74 limits movement of the roll 88 toward the roll 87.

The soldering machine includes a table 96 and a sub-table 94 from which the table 96 is supported by elements 93. At one side of the table 96, there is located a solder tank 95 into which there extends a hollow element 136 in which there is located a gas burner 137 which is supplied with combustible gas through the pipe 138 and with air through the pipe 139. The tank 95 is provided with double bottom and side walls to minimize heat losses and is supported through trunnions 143 mounted in bearings 144 so that it may be tilted to dump solder therefrom.

On the side of the table 96 which is nearest the tank 95 there is mounted a bracket 97 and on the opposite side of the table there is mounted a bracket 98. In the brackets 97 and 98, there is journaled a shaft 99 to whose outer end there is secured a pulley 100 around which and a pulley on the shaft of an electric motor (not shown) passes a belt 101.

On the shaft 99 adjacent the bracket 98, there is secured a clutch element 115 and between the clutch element and the bracket a gear 106. On the shaft 99 between the clutch element 115 and the bracket 97, there is mounted a sleeve 116 which is urged toward the clutch element 115 by a spring 117 and on which there is formed a clutch element 124 which is adapted to engage the clutch element 115. On the sleeve 116, there is also formed a pulley 125. Between the clutch element 124 and the pulley 125, there is formed in the sleeve 116 an annular groove 126 from whose wall which is nearest the pulley there projects a tooth-like cam 127.

In the brackets 97 and 98, there are also journaled shafts 102 and 103 which extend parallel to the shaft 99 and on which there are secured gears 104 and 105 which mesh with the gear 106 on the shaft 99. The shafts 102 and 103 extend into the tank 95 and on their ends which are located within the tank there are secured annularly corrugated rolls 107 and 108 whose annulets are a little deeper than the annulets of the stack of discs to be soldered and are alined transversely of the shafts.

On the table 96 on one side of the brackets 97 and 98, there are mounted two brackets 109 and 110 between which extends an axle 111 on which there is journaled a sleeve 145. To the sleeve 145, there is secured an arm 112 whose outer end overlies the shaft 99 and a lever 113—141 which is located in the same plane as the arm 112. The arm 113 of the lever 113—141 projects beyond the edge of the table 96 toward which the arm 112 extends and carries on its outer end a handle 133.

The arms 112 and 113 are connected by a rod 114 which is located above and extends parallel to the shaft 99. To the outer face of the arm 113 in axial alinement with the rod 114, there is secured a stud 146 into whose outer end there extends an axial bore 147 and a counterbore 149. Into the bore and counterbore there extends an arbor 148 which extends outwardly beyond the rolls 107 and 108. Into the space between the arbor 148 and the walls of the counterbore 149, there extends a tubular packing element 150 which is compressed by a cap 151 screwed on the stud 146. During operation of the soldering machine, the arbor 148, the packing element 150 and the cap 151 will be subjected to the deteriorative influence of molten solder and soldering flux and, consequently, to minimize the deteriorative influence of the molten solder and soldering flux thereon they are preferably made, respectively of Pyrex glass, lead and Monel metal.

Between the brackets 109 and 110, there also extends an axle 118 on which there is journaled a sleeve 119 to which there is secured an arm 120 which is connected to the arm 112 by a link 121. The outer end of the arm 120 underlies the shaft 99 and carries an upwardly projecting pin 122 which is adapted to enter the groove 126 in the sleeve 116.

On the table 96 on the side of the brackets 109 and 110 opposite that on which the brackets 97 and 98 are located, there is mounted a speed reducing mechanism 123. To the input shaft of the speed reducing mechanism, there is secured a pulley 128 around which and the pulley 125 on the sleeve 116 there extends a belt 129. To the output shaft of the speed reducing mechanism, there is secured a circular disc 130 from whose periphery there projects a single tooth 152.

To the arm 141 of the lever 113—141, there is connected a coil spring 131 which urges it downwardly. On the table 96 opposite the disc 130, there is pivotally mounted an arm 132 on whose upper end the outer end of the arm 141 is adapted to rest. To the arm 132 between its ends, there is secured a finger 134 which is held against the periphery of the disc 130 by a coil spring 135.

In manufacturing built-up bellows of the type disclosed in the Schutt patent previously mentioned in accordance with the present invention, roll e of thin metal strip, such as that shown in Figure 2, is preferably employed as stock.

The first operation in the manufacture of the bellows is that of blanking and forming the discs. To blank and form the female discs, I utilize a dieing machine, such as that shown in Figure 1, equipped with dies such as those shown in Figure 3 and to blank and form the male discs I utilize a similar machine equipped with dies such as those shown in Figure 4.

When a dieing machine such as that shown in Figure 1 is operating, its upper die is moved alternately toward and away from its lower die by the electric motor 25 and stock from a roll e is advanced over the table 57 and between the dies with an intermittent motion by suitable mechanism (not shown). The motion of the stock is so synchronized with that of the upper die that it is stopped just before or at the moment the plate 51 engages the stock on each downward stroke of the upper die and is advanced during the time that the upper die is clear of the stock such a distance that a fresh length of stock is presented to the dies upon each downward stroke of the upper die.

While the plate 51 is in engagement with the stock, it prevents shifting of it by clamping it between itself and the shelf 57 and lower blanking die 44. After the plate 51 engages the stock, further downward movement of the upper die brings the outer and inner elements thereof into engagement with the stock and effects the blanking of a disc. After the disc is blanked, further downward movement of the upper die imparts to it the desired concavo-convex form and in the case of the female disc forms on it the flanges c and d.

As the upper die moves upwardly after completing each blanking and forming operation, the springs 42 move the outer element of the lower forming die upwardly and free the disc from the die. Blasts of air which issue from the bores 153 and another blast of air which issues from a suitably located nozzle (not shown) as the upper die clears the lower die on each of its upward strokes free the disc from the upper die and sweep it clear of the dies and into a suitable receptacle (not shown). It will, of course, be understood that the small disc which is punched from the stock by the cylindrical element of the upper die during the forming operation is forced into the opening in the inner element of the lower die and, thence, into a suitably located receptacle (not shown) through the opening 37.

After blanking and forming the discs, the next step in the manufacture of the bellows consists in impaling a number of discs, alternately a female disc a and a male disc b, on the stacking stand 64 in the manner illustrated in Figure 5. The stack f of discs on the stacking stand is then "speared" by the disc holder 67 in such a manner that each juxtaposed pair of discs a and b becomes sandwiched between a pair of the plates 68 with each of the flanges d in engagement with the end of one of the notches in the plates. Then, by manipulation of the disc holder 67, the stack f of discs is removed from the stacking stand 64 and impaled on the roll 88 of the spinning machine 73. After the stack f of discs is properly disposed on the roll 88 the operator moves the arbor 86 and roll 88 toward the rotating shaft 76 and roll 87, with the result that each juxtaposed pair of outer edges of the discs enters one of the grooves in the roll 87 and each juxtaposed pair of inner edges of the discs enters one of the grooves in the roll 88. After the edges of the discs have entered the grooves in the rolls 87 and 88, further movement of the rolls toward each other locks together the discs which constitute the stack f by folding the flanges c and d of the female discs a over the juxtaposed edges of the male discs b, as shown in Figure 8. After the described operation has reached the stage at which the flanges c and d have been folded over the juxtaposed edges of the male discs sufficiently to prevent separation of the discs which constitute the stack f, the disc holder may be withdrawn from the stack, but to prevent mutilation of the discs during the spinning operation and faulty joints between the discs it should not be withdrawn before the operation has reached this stage.

When the soldering machine is operating, the tank 95 is kept filled with solder up to about the level indicated by the broken line 140 in Figure 10, and the shafts 99 and 102 and 103 and the rolls 107 and 108 are continuously rotated by the electric motor to which the belt 101 is connected. The solder in the tank 95 is kept in molten condition and at the proper temperature by the burner 137.

When the parts of the machine are in the positions in which they are shown in the drawings, rotation of the shaft 99 is imparted to the sleeve 116 by the clutch elements 115 and 124 and rotation of the sleeve 116 is imparted to the disc 130 by the belt 129 and the timing mechanism 123. When the disc 130 has rotated counterclockwise to a position somewhat in advance of that in which it is shown in Figure 13, the tooth 152 kicks the arm 132 from under the end of the arm 141 of the lever 113—141 and that end of the lever is moved downwardly and the opposite end thereof upwardly by the spring 131. Upward movement of the end 113 of the lever 113—141, through the link 121 and the arm 120, moves the pin 122 into the groove 126 in the sleeve 116. After the pin 122 has entered the groove 126, further rotation of the sleeve 116 will bring the pin 122 into engagement with the cam 127 which will cause movement of the sleeve 116 toward the bracket 97 and disengagement of the clutch elements 115 and 124. Of course, upon disengagement of the clutch elements 115 and 124, rotation of the sleeve 116 and the disc 130 will cease.

When the parts have reached the "idle" positions described in the latter part of the next preceding paragraph the soldering machine is ready for the beginning of a soldering operation.

To carry out a soldering operation, a stack f of discs which have been locked together in the manner previously described and coated with soldering flux is impaled on the arbor 148 of the soldering machine. After this has been done, the handle 133 on the lever 113—141 is depressed. Depression of the handle 133 moves the arbor 148 downwardly and projects the annulets of the stack f of discs into grooves between annulets of the rolls 107 and 108 until the outer edges of the latter reach the bottoms of the grooves between the annulets of the stack of discs and permits the spring 135 to move the upper end of the arm 132 under the outer end of the arm 141 of the lever 113—141.

As long as the upper end of the arm 132 remains under the outer end of the arm 141 of the lever 113—141, rotation of the rolls 107 and 108 is accompanied by rotation of the stack f of discs. However, when the handle 133 is depressed, the pin 122 is withdrawn from the groove 126 in the sleeve 116 and the spring 117 moves the clutch element 124 into engagement with the clutch element 115, with the result that the disc 130 begins to rotate. The stack f of discs is held in contact with the rolls 107 and 108 and rotated thereby until the tooth 152 on the disc 130 engages the finger 134 on the arm 132 and kicks the upper end of the arm 132 out from under the outer end of the arm 141 of the lever 113—141. When the upper end of the arm 132 is kicked out from under the outer end of the arm 141 of the lever 113—141, the parts of the machine will be moved to the inoperative positions in which they were at the beginning of the operation and then the stack f of discs may be removed from the arbor 148 and another stack substituted therefor.

While the stack f of discs is rotating in contact with the rolls 107 and 108, the latter pick up solder from the tank 95 and apply it to the outsides of the discs from their outer edges to the bottom of the bottom of the grooves therein. The rotation of the disc 130 is so synchronized with the rotation of the rolls 107 and 108 that by the time the tooth 152 engages the finger 134, the outsides of the discs will have been completely coated with solder and sufficient of this solder to form the perfect solder bonds designated by the reference character g in Figures 15 and 16 between the flanges c and d and the opposed surfaces of the male discs and between the opposite surfaces of the male discs and the opposed surfaces of the female discs will have seeped into the crimped joints between the discs.

Upon completion of the soldering operation, the manufacture of the bellows is completed and it is ready to be installed in the apparatus of which it is to form a part.

I claim:

1. In a machine for soldering joints in built-up bellows, a solder tank, driven rolls located in the solder tank and adapted to dip into the solder, an arbor which is adapted to support a stack of discs, a handle for moving the arbor into a position in which the stack of discs on the arbor engages the rolls, means for locking the arbor in this position, means operatively associated with the rolls for breaking the lock when the rolls have rotated through a predetermined angle, and means for moving the arbor away from the rolls when the lock has been broken.

2. In a soldering machine, a work-supporting arbor of non-metallic, solder-resisting material, and means for supporting the arbor which consists of an element in which there is provided a counterbored opening into which the arbor extends, packing of solder-resisting material between the wall of the counterbore and the arbor, and a cap of solder-resisting material threaded on the mentioned element to compress the packing.

3. In a soldering machine, a driven soldering roll, an arbor on which a piece of work may be impaled movable toward and away from a position in which the soldering roll engages the work and rotates and applies solder to it, means for holding the arbor in the mentioned position, and means for moving the mentioned means to an inoperative position and the arbor away from the mentioned position, including an element which is moved synchronously with the soldering roll when the arbor is in the mentioned position and is motionless when the arbor is out of the mentioned position.

4. In a soldering machine, a driven soldering roll, a work holder, a handle by which one of the mentioned elements may be moved to a position in which the soldering roll engages a piece of work on the work holder, a finger by which the movable element may be held in the mentioned position, a member which is mounted so that it may rotate by which the finger may be moved to a position in which it is ineffective to hold the movable element in the mentioned position, means by which the movable element may be moved from the mentioned position to a position in which the soldering roll does not engage the piece of work on the work holder when the finger is in a position in which it is ineffective to hold the movable element in the first mentioned position, means through which the mentioned member is rotated synchronously with the soldering roll when the movable element is in the first mentioned position, and means by which the last mentioned means is rendered ineffective to transmit movement to the mentioned member when the movable element is moved to the position in which the soldering roll does not engage the piece of work on the work holder.

5. The method of soldering together the inner margins of a bellows-like structure built up from metal annuli which consists of intermeshing the external ridges of the bellows-like structure and the ridges of a circumferentially ridged soldering roll whose ridges are of such dimensions that they may enter into the furrows of the bellows-like structure sufficiently that solder from them will be applied to the inner margins of the bellows-like structure, and rotating the soldering roll with its ridges coated with molten solder and the bellows-like structure with the external ridges of the bellows-like structure and the ridges of the soldering roll intermeshed sufficiently that solder from the latter is applied to the inner margins of the former.

6. The method of soldering simultaneously the inner and outer joints of a bellows which consists of flexible metal annuli whose margins are interlocked by folding the extremity of the margin of one onto a margin of another which includes impaling the bellows on an arbor, meshing the ridges of the bellows with the ridges of a circumferentially ridged soldering roll whose ridges are approximately equal in depth to the ridges of the bellows and dip into a bath of molten solder, and rotating the soldering roll and the bellows.

7. In a machine for soldering joints in built-up bellows, a solder tank, a driven roll located in the solder tank and adapted to dip into the solder, an arbor which is adapted to support a stack of discs, a handle for moving the arbor into a position in which the stack of discs on the arbor engages the roll, means for locking the arbor in this position, means operatively associated with the roll for breaking the lock when the roll has rotated through a predetermined angle, and means for moving the arbor away from the roll when the lock has been broken.

LEO C. SHIPPY.

CERTIFICATE OF CORRECTION.

Patent No. 2,145,376.　　　　　　　　　　　　January 31, 1939.

LEO C. SHIPPY.

It is hereby certified that error appears in the printed specification of the above numbered patent requiring correction as follows: Page 3, second column, line 14, for the word "roll" read rolls; page 4, second column, line 34, strike out "bottom of the bottom" and insert instead the word bottoms; and that the said Letters Patent should be read with this correction therein that the same may conform to the record of the case in the Patent Office.

Signed and sealed this 28th day of March, A. D. 1939.

Henry Van Arsdale (Seal)　　　　　　　　　　　　　　　　Acting Commissioner of Patents.